Patented Nov. 25, 1930

1,782,590

UNITED STATES PATENT OFFICE

GUSTAV WIETZEL AND JOSEF JANNEK, OF LUDWIGSHAFEN-ON-THE-RHINE, AND FRITZ FRIED, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ELIMINATION OF SULPHUR COMPOUNDS FROM GASES

No Drawing. Application filed March 29, 1928, Serial No. 265,811, and in Germany April 8, 1927.

This invention relates to an improved process for eliminating sulphur compounds from gases.

It is already known that sulphuretted hydrogen can be eliminated from gases by mixing them with the amount of oxygen or air needed to oxidize the sulphuretted hydrogen to sulphur, together with a little ammonia, and passing them over active charcoal; the sulphur deposits in the solid form on the charcoal, or when temperatures exceeding 120° centigrade are employed, it is carried away in the liquid condition or as a mist.

We have now found that the sulphur compounds contained in gases, such as those from the distillation of coal, water gas, producer gas and the like, can be converted directly into ammonium salts of the sulphur-oxygen compounds by passing the gas, in association with the amount of oxygen needed to convert the sulphur compounds contained in the gases into oxids of sulphur, at an elevated temperature over solid active adsorbents, and by adding the amount of ammonia, if not already contained in the gas, necessary for the formation of the corresponding ammonia salts, such addition being made before or after the catalytic treatment. Temperatures of from 150° to 200° centigrade are often sufficient to effect the oxidation; but in most cases it is preferable to employ a temperature of about 250° centigrade. The ammonium salts formed are then separated from the gases by deposition in large chambers, or by filtration, washing or electrical purification, and the like, or by any suitable combination of these methods. The various kinds of active charcoals are particularly suitable as adsorbents, either alone, or contained in compositions, such as charcoal with mineral bodies, silica charcoal and the like.

The ammonia may be mixed with the gas containing sulphur prior to the oxidation of the sulphur compounds to sulphur-oxygen compounds, or the gas may be treated with ammonia, or washed with ammonia water, after the catalytic oxidation. The charcoal may also first be charged with sulphur in the manner already known by passing the gas at ordinary temperature, in association with only the requisite amount of oxygen or air to oxidize the sulphur compounds to sulphur, over the charcoal, and then passing oxygen, or air, with ammonia over the same at elevated temperature, so that the sulphur is oxidized and the salts deposited as above described, or merely oxygen or air alone may be passed over the charcoal, the resulting oxids of sulphur being deposited in the form of salts from the effluent gas by the addition of ammonia or washed out with aqueous ammonia.

In the aforedescribed process alloys or compounds of alkaline earth metals or of heavy metals with metalloids of the groups 4, 5 and 6 of the periodic system with the exception of oxygen can also be used instead of active adsorbents. The metals of the iron group are particularly suitable for the said purpose, but other metals such as copper, aluminium and the like may also be used. Of metalloids, those of the 4th, 5th and 6th groups of the periodic system other than oxygen, can be employed. Thus very suitable catalysts are for example the carbids, silicids, nitrids, phosphids, sulfids as well as alloys of the above mentioned metals with titanium, zirconium, antimony. With such alloys or compounds the process is preferably carried out at temperatures of about 400° centigrade. The catalysts belonging to the groups of active adsorbents and of the aforesaid catalysts are all comprised by the term "active catalysts."

The employment of the aforesaid active catalysts has the advantage that they enable the operation to be conducted at a very low temperature, and that they are far more efficient than, for example, bog-iron and the like, that is to say, a considerably smaller quantity of the catalytic material is needed to treat a given volume of gas. Moreover, in the case of active charcoal, for example, there is less fear of the granules crumbling after prolonged use than with, for example, iron oxid masses.

Frequently when adding the gaseous ammonia to the hot gases at any convenient place, obnoxious incrustations of salts are deposited from the gases on cooling, for example, on the heat regenerator or plants for generating steam or coolers and others. The said incrustations are not only difficult to remove, but also prevent a good transmission of heat to the cooling surfaces, thereby diminishing the cooling action, so that the gases pass with gradually rising temperatures into the salt separator, so that the salts are separated only incompletely.

The said drawbacks are obviated, if the hot gases coming from the catalyst and containing the sulphur-oxygen compounds are first cooled, but only to such a degree that the amount of water vapor necessary for the formation of ammonium salts, in particular of ammonium sulfite according to the equation $$SO_2 + 2NH_3 + H_2O = (NH_4)_2SO_3$$

and preferably even more than this amount remains in the gas and then adding gaseous ammonia while thoroughly mixing, and separating the salts formed.

The following examples will further illustrate the nature of the said invention which however is not limited thereto.

Example 1

Brown-coal producer gas containing 14 grams of sulphur per cubic metre, is mixed with 10 per cent by volume of air and 2 per cent by volume of ammonia, and passed at 260° centigrade over active charcoal, by which means practically the whole of the sulphur contained in the gas is oxidized and converted into ammonium salts, which are then deposited from the gas, for example, in an electrical high-tension field.

Example 2

Producer gas containing 10 grams of sulphur in each cubic metre is mixed with 7 to 8 per cent by volume, of air and passed at 400° centigrade over a catalyst consisting of an alloy of iron, silica and phosphorus. The escaping hot gases are passed through a regenerator through which the gases freshly admitted to the catalyst are passed in an opposite direction, and are then cooled to 30° centigrade and mixed at this temperature with from 1.4 to 1.6 per cent, by volume, of gaseous ammonia. The salts formed are precipitated in an electric separator.

Example 3

Producer gas containing 2.7 grams of sulphur in each cubic metre is passed after being mixed with 2 per cent, by volume, of air, over a granular catalyst consisting of an alloy of 67 per cent of iron, 22 per cent of phosphorus and 11 per cent of silicon, heated to 400° centigrade whereby practically all of the sulphur contained in the gas is oxidized. 0.4 per cent by volume, of gaseous ammonia is mixed with the gases escaping at about 350° centigrade whereby the formation of the ammonium salts of the sulphur oxids is effected which are separated for instance by means of an electric high tension field.

What we claim is:

1. A process for the elimination of sulphur compounds from gases by a catalytic treatment, which comprises passing the gas, together with a sufficient amount of a gas containing oxygen to oxidize the sulphur compounds to oxygen compounds of sulphur, over an active catalyst comprising a metal other than an alkali metal and a metalloid from groups 5 and 6 of the periodic system other than oxygen at an elevated temperature and combining the sulphur oxids with the requisite amount of ammonia to form the corresponding ammonium salt and separating the latter.

2. A process for the elimination of sulphur compounds from gases by a catalytic treatment, which comprises passing the gas, together with a sufficient amount of a gas comprising oxygen to oxidize the sulphur compounds to oxygen compounds of sulphur, over an active catalyst comprising a metal other than an alkali metal and a metalloid from groups 5 and 6 of the periodic system other than oxygen at an elevated temperature and washing out the said oxygen compounds of sulphur with ammonia solution.

3. A process for the elimination of sulphur compounds from gases by a catalytic treatment, which comprises passing the gas, together with a sufficient amount of a gas comprising oxygen to oxidize the sulphur compounds to oxygen compounds of sulphur and the requisite amount of ammonia to form the corresponding ammonium salt, over an active catalyst comprising a metal other than an alkali metal and a metalloid from groups 5 and 6 of the periodic system other than oxygen at an elevated temperature and separating off the salt.

4. A process for the elimination of sulphur compounds from gases by a catalytic treatment, which comprises passing the gas, together with only such an amount of a gas comprising oxygen sufficing to oxidize the sulphur compounds to sulphur over an active catalyst comprising a metal other than an alkali metal and a metalloid from groups 5 and 6 of the periodic system other than oxygen at room temperature and thereupon treating the said catalyst laden with sulphur with a gas comprising oxygen at an elevated temperature in the presence of ammonia and separating off the salt.

5. A process for the elimination of sulphur compounds from gases by a catalytic treatment, which comprises passing the gas, together with only such an amount of a gas comprising oxygen sufficing to oxidize the sulphur compounds to sulphur over an active catalyst comprising a metal other than an alkali metal and a metalloid from groups 5 and 6 of the periodic system other than oxygen at room temperature and thereupon treating the said catalyst laden with sulphur with a gas comprising oxygen at an elevated temperature and washing out the oxygen compounds of sulphur with ammonia solution.

6. A process for the elimination of sulphur compounds from gases by a catalytic treatment, which comprises passing the gas, together with a sufficient amount of a gas comprising oxygen to oxidize the sulphur compounds to oxygen compounds of sulphur over a catalyst comprising a metal other than an alkali metal and a metalloid from the groups 4, 5 and 6 of the periodic system other than oxygen, the said catalyst being stable under the conditions of the reaction, at an elevated temperature in the presence of the requisite amount of ammonia to form the corresponding ammonium salt and separating off the salt.

7. A process for the elimination of sulphur compounds from gases by a catalytic treatment as ammonium salt, which consists in passing the gas, together with a sufficient amount of a gas comprising oxygen to oxidize the sulphur compounds to oxygen compounds of sulphur over an active catalyst at an elevated temperature and then cooling the gases only to such an extent that the amount of water theoretically required for the formation of ammonium salts is formed, then adding gaseous ammonia and separating off the salt.

In testimony whereof we have hereunto set our hands.

GUSTAV WIETZEL.
JOSEF JANNEK.
FRITZ FRIED.